United States Patent
Dai et al.

(10) Patent No.: US 8,465,680 B2
(45) Date of Patent: Jun. 18, 2013

(54) METHOD FOR PELLETING SPHERICAL FINE PARTICLE OF SODIUM NITRATE

(76) Inventors: Liangyu Dai, Fujian (CN); Wangfa Wu, Fujian (CN)

(*) Notice: Subject to any disclaimer, the term of this patent is extended or adjusted under 35 U.S.C. 154(b) by 0 days.

(21) Appl. No.: 13/379,335

(22) PCT Filed: Jun. 17, 2010

(86) PCT No.: PCT/CN2010/074011
§ 371 (c)(1),
(2), (4) Date: Dec. 19, 2011

(87) PCT Pub. No.: WO2010/148983
PCT Pub. Date: Dec. 29, 2010

(65) Prior Publication Data
US 2012/0098151 A1  Apr. 26, 2012

(30) Foreign Application Priority Data
Jun. 26, 2009  (CN) .......................... 2009 1 0112134

(51) Int. Cl.
*B29B 9/00* (2006.01)

(52) U.S. Cl.
USPC .......... 264/13; 71/64.03; 71/64.04; 71/64.06

(58) Field of Classification Search
None
See application file for complete search history.

(56) References Cited

U.S. PATENT DOCUMENTS

| 3,951,638 A * | 4/1976 | Bradley | 71/11 |
| 4,031,174 A * | 6/1977 | Bennett | 264/14 |
| 2008/0272508 A1 * | 11/2008 | Culbert et al. | 264/8 |

\* cited by examiner

*Primary Examiner* — Mary F Theisen

(57) ABSTRACT

Provided is a method for pelleting spherical fine particle of sodium nitrate, which comprises the following steps: 1) melting industrial sodium nitrate in a salt melting furnace, introducing into a high-level insulation buffer tank, placing in an atomizer located on top of the pelleting tower, atomizing to obtain fog droplets with size of 30 μm-0.5 mm; 2) introducing freeze-dried high-pressure air into the pelleting tower in a tangent direction from the upper inlet pipe of the tower, so that the sodium nitrate fog droplets obtained in step 1) fall spirally along the wall in the pelleting tower, to obtain sodium nitrate particle; 3) collecting the cooled sodium nitrate particle at the bottom of the tower, and packaging. Sodium nitrate particle with lower water content, higher roundness, and smaller size can be obtained, and continuous production can be realized by the method.

7 Claims, 2 Drawing Sheets

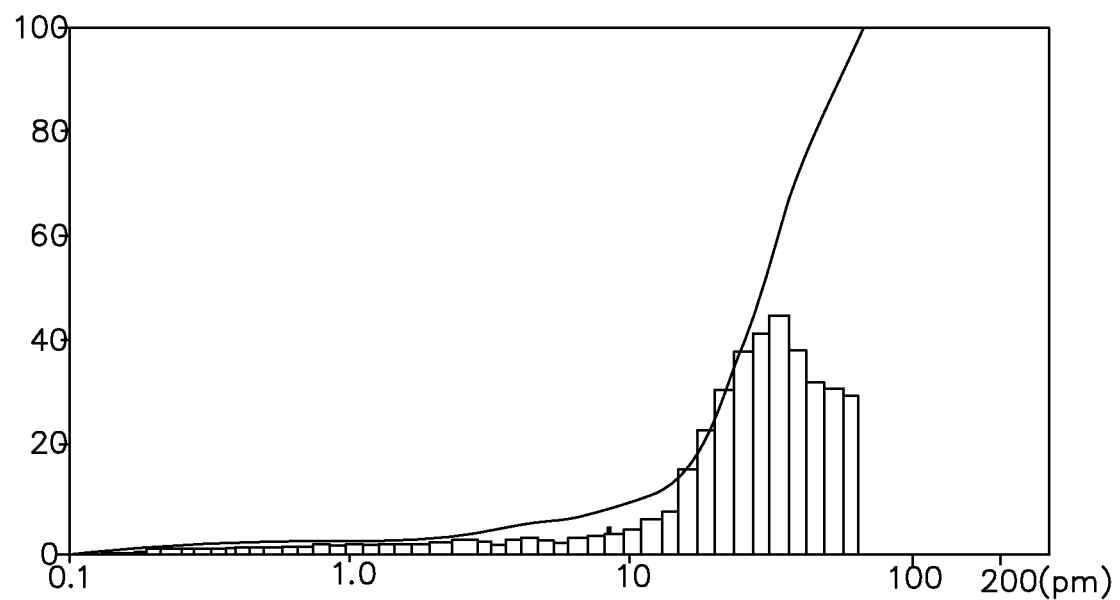
F I G. 2

METHOD FOR PELLETING SPHERICAL FINE PARTICLE OF SODIUM NITRATE

BACKGROUND OF THE INVENTION (a) Field of the Invention

The present invention relates to a method for pelleting spherical fine particles of sodium nitrate.

(b) Description of the Related Art

General industrial sodium nitrate (in compliance with the national standard GB/T4553) is an irregular aspherical crystalline powder with high water content, easy absorption of moisture to form cakes, poor disperability, and inconvenience to use. To overcome the aforementioned problems of existing sodium nitrate particles, CN1205125C provides a method of manufacturing sodium nitrate particles, wherein industrial sodium nitrate is melted and pumped in a the high-level tank, and then sprayed out from a nozzle of a low-level pelleting tower, and a dispersion device is provided to shake the melted sodium nitrate up and down, and back and forth to form uniform droplets, and the droplets falling down in the pelleting tower are contacted with an upstream of air and cooled to form particles to achieve the effects of reducing the water content and enhancing the dispersability.

However, the aforementioned manufacturing method still has the following deficiencies:

1. The spherical or oval droplets sprayed out from the nozzle are deformed naturally during the falling process, so that various different shaped particles are obtained after the cooling process, and the roundness of the particles with an irregular shape fails to reach the level of 0.8, and the number of spherical particle is far less than 80%, and the dispersability requires improvements;

2. The droplets of sodium nitrate come with large specific surface area and strong moisture absorption, and the method using room-temperature air with larger water content to cool the droplets of sodium nitrate solution leads to the production of heavy sodium nitrate particles with a large quantity of absorbed water;

3. The use of reciprocating vibration technology can disperse the droplets of sodium nitrate to form particles with a diameter within a range of 0.3~3 mm, and a very low yield rate of the particles having a size within a range of 0.5 mm~1 mm, and the diameter of the particles of the product cannot be controlled below 0.5 mm; and 4. A continual production cannot be achieved.

SUMMARY OF THE INVENTION

It is a primary objective of the present invention to overcome the problems of the prior art by providing a method for pelleting spherical fine particles of sodium nitrate. The pelleting method can obtain sodium nitrate particles with lower water content, higher roundness and smaller size than the present existing sodium nitrate particles.

To achieve the aforementioned objective, the present invention provides a method for pelleting spherical fine particles of sodium nitrate, and the method comprises the following steps:

1) Melt industrial sodium nitrate in a salt melting furnace, introduce the industrial sodium nitrate into a high-level insulation buffer tank, and then place the industrial sodium nitrate into an atomizer located at the top of a pelleting tower to atomize the industrial sodium nitrate into fog droplets with a diameter within a range of 30 μm~0.5 mm;

2) introduce freeze-dried high-pressure air in a tangent direction from an upper inlet pipe of the pelleting tower into the pelleting tower to drop sodium nitrate fog droplets obtained in step 1) spirally along a wall in the pelleting tower, so as to obtain spherical fine particles of sodium nitrate; and 3) Collect the cooled spherical fine particles of sodium nitrate at the bottom of the tower, and package the spherical fine particles of sodium nitrate to obtain a product.

In this method, the freeze-dried high-pressure air has a dew point lower than the temperature of room-temperature air, so that the use of the high-pressure air as a medium for cooling the sodium nitrate particles has the advantage of reducing the water content of the particles. When the dew point of the high-pressure air used in the Step 2) drops to −60° C., the water content of the sodium nitrate particles drops below 0.05%. In the meantime, the method further introduces the freeze-dried high-pressure air in a tangent direction, such that the sodium nitrate particles fall spirally along the wall in the pelleting tower to obtain the sodium nitrate particles with high roundness. In addition, the freeze-dried high-pressure air pressure used in Step 2) generally has a pressure of 0.005~5 MPa and a temperature substantially equal to room temperature.

Of course, the melted industrial sodium nitrate solution can be introduced into the atomizer directly under the condition of not requiring a continual production.

In a preferred embodiment of the present invention, the pelleting tower includes an inlet pipe installed at the bottom of the pelleting tower, and the freeze-dried high-pressure air is introduced from bottom to top from the inlet pipe into the pelleting tower to extend the time of the spiral movement of the sodium nitrate droplets or particles in the pelleting tower, so as to obtain the sodium nitrate particles with higher roundness. If the time for the spiral movement of the sodium nitrate particles in the pelleting tower is approximately equal to 5 minutes, at least 80% of the sodium nitrate particles have the roundness over 0.8. Preferably, the high-pressure air introduced from the lower inlet pipe into the pelleting tower and the high-pressure air introduced from the upper inlet pipe into the pelleting tower are produced by the same freeze-dried air compressor, so that their technical parameters including the pressure, temperature, and dew point are identical.

The atomizer of the present invention includes but not limited to the conventional rotary atomizer, pressure-nozzle atomizer and dual-fluid nozzle atomizer. In general, the rotary atomizer can produce finer particles, and the pressure-nozzle atomizer and dual-fluid nozzle atomizer can produce larger particles. The fog droplets of sodium nitrate have a diameter that allows the fog droplets to pass through the airflow of compressed air, and the technical parameters such as the diameter and rotating speed of the nozzle can be adjusted to produce particles of a size within a range of 30 μm~0.5 mm.

In a preferred embodiment of the present invention, the atomizer performs a high-pressure atomization at a temperature within a range of 280~310° C. and a pressure within a range of 0.9~1.0 Mpa and preferably the temperature within a range of 300~308° C. and the pressure within a range of 1.0 Mpa.

In a preferred embodiment of the present invention, the raw material of industrial sodium nitrate as described in the Step 1) is melted into a liquid by electric heating in a salt melting furnace, and moisture in the raw material is evaporated and discharged. A return pipe is installed between the high-level insulation buffer tank and the salt melting furnace for limiting the liquid level in the high-level tank to achieve the continual melting and production processes, so as to lower the production cost and provide a stable quality of the product.

In a preferred embodiment of the present invention, the air in the tower and the sodium nitrate powder suspended in the tower pass through a wind pipe installed at the bottom of the pelleting tower and enter into a cyclone separator for a separation, and the obtained powder is collected from an outlet of the cyclone separator and packaged, and the air containing a trace of powdered sodium nitrate is introduced from an outlet pipe into a water absorbing tank and then discharged into the atmosphere. The wind pipe is located under the lower inlet pipe.

Unless specified otherwise, the technologies and scientific terms are used with the same meaning that persons ordinarily skilled in the art can understand. In addition, publication, patent applications, patents and other reference can be introduced as reference of the present invention.

Compared with the prior art, the present invention has the following beneficial effects:

1) The method introduces the freeze-dried high-pressure air in a tangent direction from the top of the pelleting tower and the sodium nitrate fog droplets fall spirally along the wall in the pelleting tower to achieve the effect of obtaining most of the sodium nitrate particles with a roundness over 0.8, and the contact between particles is a point contact, so that the product will not be aggregated as easy as the conventional products with insufficient roundness, so that the invention provides a better dispersability;

2) The pelleting tower includes an inlet pipe installed at the bottom of the pelleting tower, and the freeze-dried high-pressure air is introduced from bottom to top from the inlet pipe into the pelleting tower to extend the time of the spiral movement of the sodium nitrate droplets or particles in the pelleting tower, so as to obtain the sodium nitrate particles with higher roundness;

3) The atomization method is adopted to obtain very small particles, and a product with a specific particle size can be obtained by making adjustments as needed;

4) The present invention introduces the melted sodium nitrate into a high-level insulation buffer tank, and a return pipe is installed between the high-level insulation buffer tank and the salt melting furnace, so that the aforementioned structure can perform the salt melting process and the atomization process independently to achieve the industrial continual production; and 5) The freeze-dried high-pressure air is used for cooling the sodium nitrate droplets to reduce the water content of the obtained sodium nitrate particles.

BRIEF DESCRIPTION OF THE DRAWINGS

FIG. 2 is a graph of volume versus weight of sodium nitrate particles.

DETAILED DESCRIPTION OF THE PREFERRED EMBODIMENTS

Figure 1:
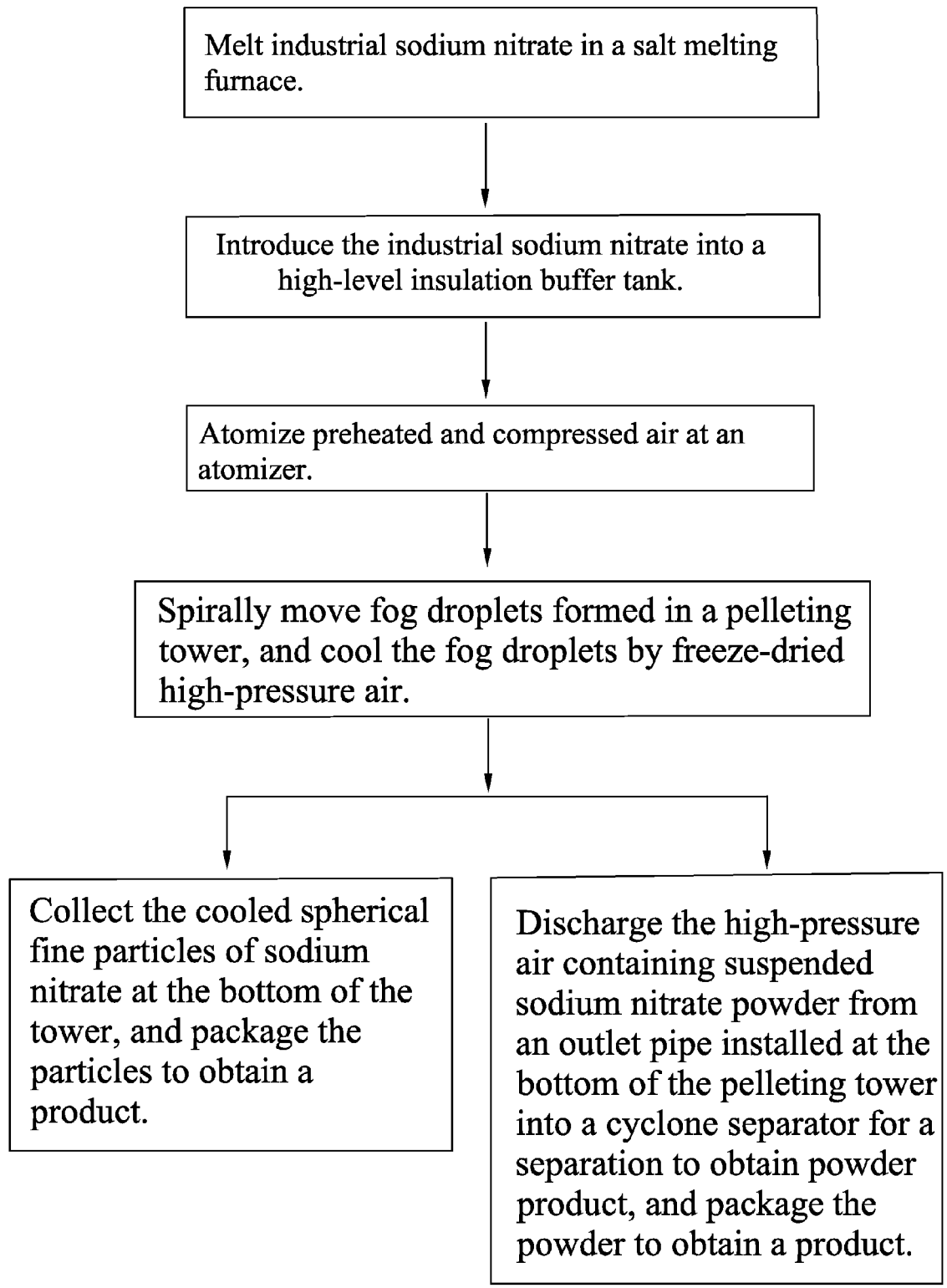
FIG. 1 is a flow chart of a production procedure of a preferred embodiment of the present invention.

With reference to FIG. 1 for a preferred embodiment of the present invention, industrial sodium nitrate is placed into a salt melting furnace and melt into a liquid by electric heating, and moisture in the raw material is evaporated. The melted sodium nitrate solution is introduced into a high-level insulation buffer tank by using a high-temperature pump in the salt melting furnace, and then transmitted to an atomizer located at the top of a pelleting tower by a potential difference to atomize the sodium nitrate into fog droplets with a maximum diameter of 0.5 mm and an average diameter of 30 microns.

The high-pressure air atomized by the atomizer has a temperature of 300° C. and a pressure of 1.0 Mpa to prevent the melted sodium nitrate from being condensed in the atomization process.

The pelleting tower includes an upper inlet pipe and a lower inlet pipe, and a freeze-dried air compressor with a dew point of −80° C. and a pressure of 1.0 MPa is provided for introducing room-temperature high-pressure air with a flow of 1:3 from the upper inlet pipe and the lower inlet pipe into the pelleting tower, wherein the high-pressure air enters in a tangent direction from the upper inlet pipe into the tower, such that the fog droplets of sodium nitrate entering from the top of the tower fall spirally along the wall of the pelleting tower, and the high-pressure air entering from bottom to top from the lower inlet pipe into the pelleting tower, so that the time for each sodium nitrate particle to move spirally is maintained at approximately 5 minutes.

The pelleting tower includes a wind pipe installed under the lower inlet pipe, and the high-pressure air entering into the tower and the sodium nitrate powder suspended in the tower are introduced from the a wind pipe at the bottom of the pelleting tower, and then entered into a cyclone separator for a separation and the powdered obtained from the separation is connected at an outlet of the cyclone separator and packaged into a product. The air containing a trace of powdered sodium nitrate is discharged from an outlet pipe through the cyclone separator and absorbed by a water absorbing tank, and then discharged into the atmosphere.

The cooled spherical fine particles of sodium nitrate are collected from the bottom of the pelleting tower and packaged to obtain a product.

The physical and chemical parameters of the product with the sodium nitrate particles are listed below:

1) A laser particle testing instrument (Model No. JL-1155) is used for testing the fine particles of sodium nitrate as shown in FIG. 2, and measurements show that the particle has a diameter less than 1 mm and the particle content is equal to 100%;

2) The aforementioned fine particles of sodium nitrate are stored with regular storage conditions for half year, and then the laser particle testing instrument (Model No. JL-1155) is used for testing the fine particles of sodium nitrate, and measurements show that the particle has a diameter less than 1 mm, and the particle content is equal to 99.9%, and the sieve rate is equal to 0.01%;

3) The water content of the particles is measured by the Karl Fischer method, and the measured content is equal to 0.03%; and 4) The roundness of 85% of the total quantity of the sodium nitrate particle reaches 0.8.

While the invention has been described by means of specific embodiments, numerous modifications and variations could be made thereto by those skilled in the art without departing from the scope and spirit of the invention set forth in the claims.

We claim:

1. A method for pelleting spherical fine particle of sodium nitrate, comprising the steps of:
   1) melting industrial sodium nitrate in a salt melting furnace, introducing the industrial sodium nitrate into a high-level insulation buffer tank, and then placing the industrial sodium nitrate into an atomizer located at the top of a pelleting tower to atomize the industrial sodium nitrate into fog droplets with a diameter falling within a range of 30 μm~0.5 mm;
   2) introducing freeze-dried high-pressure air in a tangent direction from an upper inlet pipe of the pelleting tower into the pelleting tower to drop sodium nitrate fog droplets obtained in step 1) spirally along a wall in the pelleting tower, so as to obtain spherical fine particles of sodium nitrate;

3) collecting the cooled spherical fine particles of sodium nitrate at the bottom of the tower, and packaging the spherical fine particles of sodium nitrate to obtain a product.

2. The method for pelleting spherical fine particle of sodium nitrate as recited in claim 1, wherein the high-pressure air used in the step 2) has a dew point below −60° C.

3. The method for pelleting spherical fine particle of sodium nitrate as recited in claim 2, wherein the pelleting tower includes an inlet pipe installed at the bottom of the pelleting tower for introducing the freeze-dried high-pressure air from bottom to top through the inlet pipe into the pelleting tower.

4. The method for pelleting spherical fine particle of sodium nitrate as recited in claim 3, wherein the freeze-dried high-pressure air is produced by passing air through a same freeze-dried air compressor and flowing into a lower inlet pipe and an upper inlet pipe of the pelleting tower separately.

5. The method for pelleting spherical fine particle of sodium nitrate as recited in claim 4, wherein the atomizer adopts high-pressure air with a temperature falling within a range of 280~310° C. and a pressure falling within a range of 0.9~1.0 Mpa for the atomization.

6. The method for pelleting spherical fine particle of sodium nitrate as recited in claim 1, 2, 3, 4, or 5, wherein the air in the tower and the sodium nitrate powder suspended in the tower pass through a wind pipe installed at the bottom of the pelleting tower and enter into a cyclone separator for a separation, and the obtained powder is collected from an outlet of the cyclone separator and packaged, and air containing a trace of powdered sodium nitrate is introduced from an outlet pipe into a water absorbing tank, and discharged into the atmosphere.

7. The method for pelleting spherical fine particle of sodium nitrate as recited in claim 6, wherein the wind pipe is disposed under a lower inlet pipe.

* * * * *